US011456636B2

(12) United States Patent
Jung et al.

(10) Patent No.: US 11,456,636 B2
(45) Date of Patent: Sep. 27, 2022

(54) MOTOR

(71) Applicant: LG INNOTEK CO., LTD., Seoul (KR)

(72) Inventors: Young Hwan Jung, Seoul (KR); Kyung Sang Park, Seoul (KR); Hyo Yun Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 82 days.

(21) Appl. No.: 16/968,073

(22) PCT Filed: Feb. 1, 2019

(86) PCT No.: PCT/KR2019/001414
§ 371 (c)(1),
(2) Date: Aug. 6, 2020

(87) PCT Pub. No.: WO2019/156441
PCT Pub. Date: Aug. 15, 2019

(65) Prior Publication Data
US 2021/0367464 A1    Nov. 25, 2021

(30) Foreign Application Priority Data

Feb. 8, 2018 (KR) .................. 10-2018-0015618
May 11, 2018 (KR) .................. 10-2018-0054202

(51) Int. Cl.
   *H02K 1/27*       (2022.01)
   *H02K 1/278*     (2022.01)
   *H02K 7/00*       (2006.01)

(52) U.S. Cl.
CPC ............ *H02K 1/278* (2013.01); *H02K 7/003* (2013.01)

(58) Field of Classification Search
CPC ........ H02K 29/06; H02K 11/21; H02K 7/003; H02K 1/278
(Continued)

(56) References Cited

U.S. PATENT DOCUMENTS

2016/0327410 A1    11/2016    Kochan, Jr. et al.

FOREIGN PATENT DOCUMENTS

CN          104052208     *  9/2014 ............. H02K 15/02
DE   10 2006 045 178 A1   4/2008
(Continued)

OTHER PUBLICATIONS

International Search Report in International Application No. PCT/KR2019/001414, filed Feb. 1, 2019.
(Continued)

*Primary Examiner* — Terrance L Kenerly
(74) *Attorney, Agent, or Firm* — Saliwanchik, Lloyd & Eisenschenk

(57) ABSTRACT

The present invention may provide a motor including a housing, a stator disposed inside the housing, a rotor disposed inside the stator, and a shaft coupled to the rotor, wherein the rotor includes a rotor core and magnets including a plurality of unit magnets coupled to an outer circumferential surface of the rotor core, the rotor core includes grooves disposed at a boundary between an inner circumferential surface and an upper surface of the rotor core, the shaft includes a first body, a plurality of blades extending outward from an upper surface of the first body, and a protrusion extending downward from a lower surface of the first body, and a side edge of the blade is positioned at a lateral center of the unit magnet when the protrusion is disposed in the groove.

12 Claims, 14 Drawing Sheets

(58) Field of Classification Search
USPC .............................. 310/156.1, 156.05, 68 B
See application file for complete search history.

(56) References Cited

FOREIGN PATENT DOCUMENTS

| | | | | |
|---|---|---|---|---|
| DE | 102006045178 | * | 4/2008 | ............... H02K 1/28 |
| DE | 10 2015 109 030 A1 | | 12/2015 | |
| EP | 3 179 616 A1 | | 6/2017 | |
| JP | 2-36744 A | | 2/1990 | |
| JP | H0236744 B2 | * | 8/1990 | ............... H02K 1/28 |
| JP | 2003-299279 A | | 10/2003 | |
| JP | 2010-11591 A | | 1/2010 | |
| JP | 2013-81326 A | | 5/2013 | |
| JP | 2014-509702 A | | 4/2014 | |
| KR | 10-2013-0118042 A | | 10/2013 | |
| KR | 10-2016-0118612 A | | 10/2016 | |
| KR | 10-2017-0123484 A | | 11/2017 | |

OTHER PUBLICATIONS

Office Action dated Jan. 17, 2022 in Chinese Application No. 201980012601.5.
Supplementary European Search Report dated Sep. 30, 2021 in European Application No. 19751660.2.

\* cited by examiner

MOTOR

CROSS-REFERENCE TO RELATED APPLICATIONS

This application is the U.S. national stage application of International Patent Application No. PCT/KR2019/001414, filed Feb. 1, 2019, which claims the benefit under 35 U.S.C. § 119 of Korean Application Nos. 10-2018-0015618, filed Feb. 8, 2018; and 10-2018-0054202, filed May 11, 2018, the disclosures of each of which are incorporated herein by reference in their entirety.

TECHNICAL FIELD

The present invention relates to a motor.

BACKGROUND ART

Motors are used as driving sources of braking systems of vehicles. A motor includes a rotor and a stator. The rotor is coupled to a shaft. When the rotor rotates, the shaft is rotated in conjunction with the rotor. The shaft is connected to a braking system of a vehicle to provide power required for braking.

The rotor may have a hollow shape. In addition, the shaft may also have a hollow shape. In addition, the shaft may be inserted into an inner circumferential surface of the rotor. There is a problem in that slipping occurs between the shaft and the rotor after the shaft and the rotor are assembled.

In addition, a device for detecting rotation of the rotor may be disposed on the shaft. Accordingly, it is important to align the shaft with the rotor in a rotational direction during a process of assembling the rotor and the shaft. However, when the rotor is coupled to the shaft, there is a problem in that it is very difficult to align the rotor with the shaft in the rotational direction.

Meanwhile, magnets may be directly attached to an outer circumferential surface of the shaft. In addition, a rotation detector rotated in conjunction with the shaft may be disposed on the shaft in order to detect the rotation of the shaft. It is important to align the shaft with the rotation detector in the rotational direction during a process of assembling the shaft and the rotation detector. However, there is a problem in that it is very difficult to align the shaft with the rotation detector in the rotational direction.

In addition, there is a problem in that it is very difficult to attach the magnets to the shaft using a device due to the rotation detector.

Technical Problem

The present invention is directed to providing a motor in which slipping between a shaft and a rotor in a rotational direction is inhibited and which allows the shaft and the rotor to be easily aligned with each other in the rotational direction during a process of assembling the shaft and the rotor.

The present invention is directed to providing a motor allowing a shaft and a rotation detector to be easily aligned with each other in a rotational direction during a process of assembling the shaft and the rotation detector.

The present invention is directed to providing a motor allowing work of attaching a magnet to a shaft to be facilitated.

Objectives that should be solved according to embodiments are not limited to the above described objectives, and other objectives which are not described above will be clearly understood by those skilled in the art from the following specification.

Technical Solution

One aspect of the present invention provides a motor including a housing, a stator disposed inside the housing, a rotor disposed inside the stator, and a shaft coupled to the rotor, wherein the rotor includes a rotor core and a plurality of magnets disposed on an outer circumferential surface of the rotor core, the rotor core includes grooves concavely disposed at a boundary between an inner circumferential surface and an upper surface of the rotor core, the shaft includes a first body, a plurality of blades extending from an upper surface of the first body in a radial direction, and a plurality of protrusions protruding downward from a lower surface of the first body, and the plurality of protrusions of the shaft are disposed in the plurality of grooves of the rotor core.

At least one of the plurality of blades may overlap two adjacent magnets of the plurality of magnets.

The at least one blade may be disposed between centers of the two adjacent magnets.

The plurality of blades may be disposed to be spaced apart from each other by a predetermined interval in a circumferential direction of the first body, and extension lines extending along side surfaces of the plurality of blades may pass through a center of the shaft.

The extension lines extending along the side surfaces of the plurality of blades may pass through longitudinal centers of the magnets in a circumferential direction thereof.

At least ones of the plurality of blades or the plurality of protrusions or the plurality of grooves may be disposed to be rotationally symmetrical with respect to a center of the shaft.

A radius from a center of the shaft to an outer side surface of the blade may be greater than a maximum radius from a center of the rotor core to the magnet.

The rotor may further include a can disposed outside the magnet, the can may include a second body and an upper surface bent to extend from an upper surface of the second body, and an inner radius of the upper surface may correspond to an outer diameter of the first body of the shaft.

Another aspect of the present invention provides a motor including a housing, a stator disposed inside the housing, a shaft disposed inside the stator, and a plurality of magnets disposed on an outer circumferential surface of the shaft, wherein the shaft includes a first part, a second part which extends from the first part and has an outer diameter different from an outer diameter of the first part, and a blade portion extending from the second part in a radial direction, the first part includes an outer circumferential surface on which a plurality of guide protrusions are formed at predetermined intervals in a circumferential direction, the plurality of magnets are disposed between the plurality of guide protrusions of the first part, and a plurality of blades of the blade portion are disposed at predetermined intervals in the circumferential direction.

A body of the second part and the blade portion may be formed to be divided from each other, the body may include a groove, the blade portion may include a ring portion having a circular shape and a plurality of protrusions bent from an inner circumferential surface of the ring portion, the plurality of blades may be formed to protrude from an outer circumferential surface of the ring portion, and the protrusion of the blade portion may be disposed in the groove of the body.

Advantageous Effects

According to embodiments, an advantageous effect is provided in that generation of slipping in a rotational direction is inhibited.

An advantageous effect is provided in that a shaft is easily aligned with a rotor in a rotational direction during a process of assembling the shaft and the rotor.

An advantageous effect is provided in that a shaft is easily aligned with a rotation detector in a rotational direction.

An advantageous effect is provided in that a magnet is easily attached to a shaft regardless of a device disposed on the shaft and configured to detect rotation of the shaft.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. Terms and words used in this specification and claims are not to be interpreted as limited to commonly used meanings or meanings in dictionaries and should be interpreted as having meanings and concepts which are consistent with the technological scope of the invention based on the principle that the inventors have appropriately defined concepts of terms in order to describe the invention in the best way. In addition, in the description of the invention, when it is determined that detailed descriptions of related well-known functions unnecessarily obscure the gist of the invention, the detailed descriptions thereof will be omitted.

Although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

Figure 1:
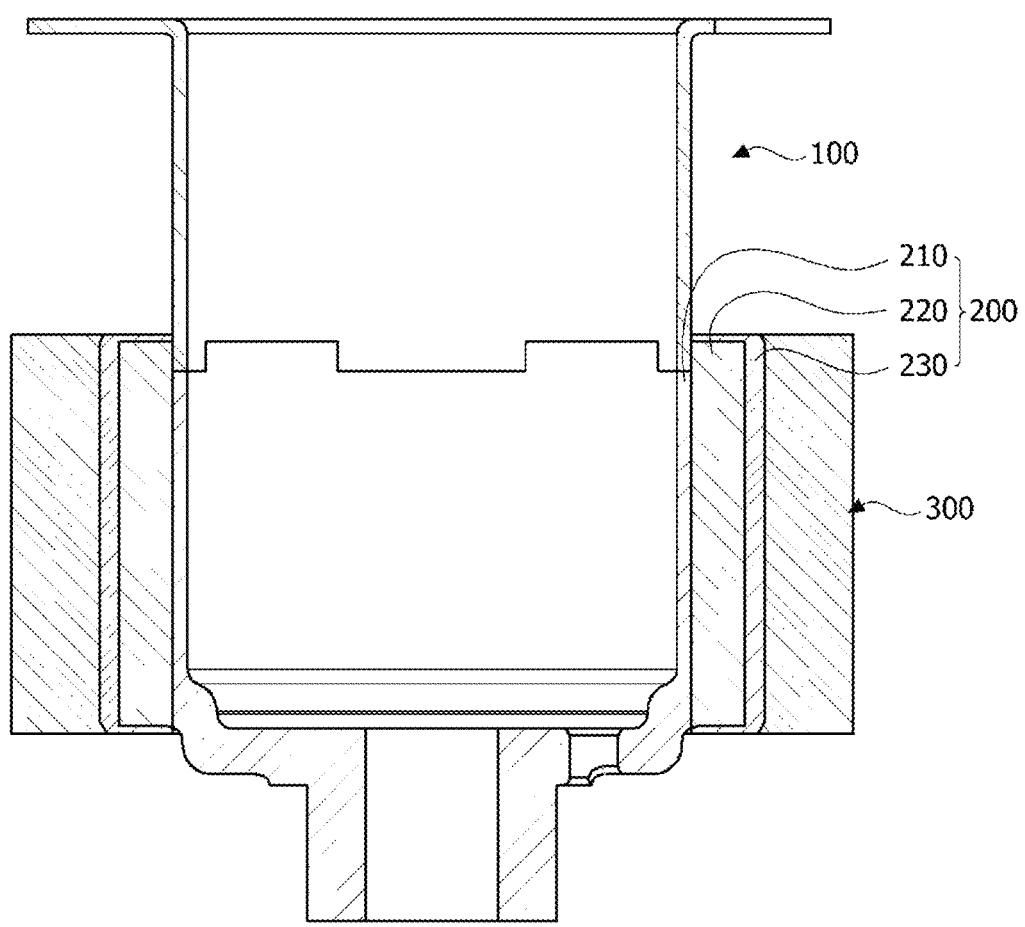
FIG. 1 is a view illustrating a motor according to a first embodiment.

FIG. 1 is a view illustrating a motor according to a first embodiment.

Referring to FIG. 1, the motor according to the embodiment may include a shaft 100, a rotor 200, and a stator 300.

The shaft 100 may be coupled to the rotor 200. When a current is supplied and an electrical interaction occurs between the rotor 200 and the stator 300, the rotor 200 is rotated, and the shaft 100 is rotated in conjunction with the rotor. The shaft 100 may be connected to a steering shaft of a vehicle and may transmit power to the steering shaft. The shaft 100 may have a hollow tube shape.

The rotor 200 is rotated due to the electrical interaction with the stator 300.

The rotor 200 may include a rotor core 210, magnets 220, and a can 230. The rotor core 210 may have a hollow tube shape. The magnets 220 are attached to an outer circumferential surface of the rotor core 210. The can 230 surrounds the magnets 220. The can 230 is a member for protecting the magnets 220.

The stator 300 is disposed outside the rotor 200. Coils may be wound around the stator 300. The coils induce an electrical interaction with the magnets 220 of the rotor 200. The stator 300 may include a stator core including a plurality of teeth. An annular yoke portion and the teeth around which a coil is wound from a yoke toward a center thereof may be provided in the stator core. The teeth may be provided along an outer circumferential surface of the yoke portion at predetermined intervals. Meanwhile, the stator core may be provided as a plurality of thin steel plates which are stacked. In addition, the stator core may be provided as a plurality of divided cores which are coupled or connected.

Figure 2:
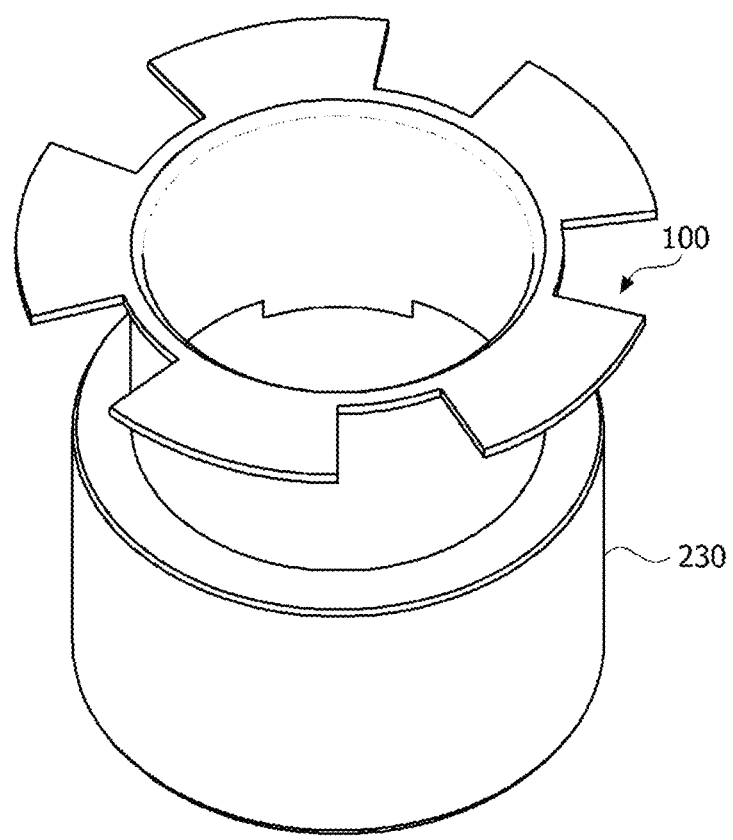
FIG. 2 is a perspective view illustrating a shaft and a rotor illustrated in FIG. 1.
Figure 3:
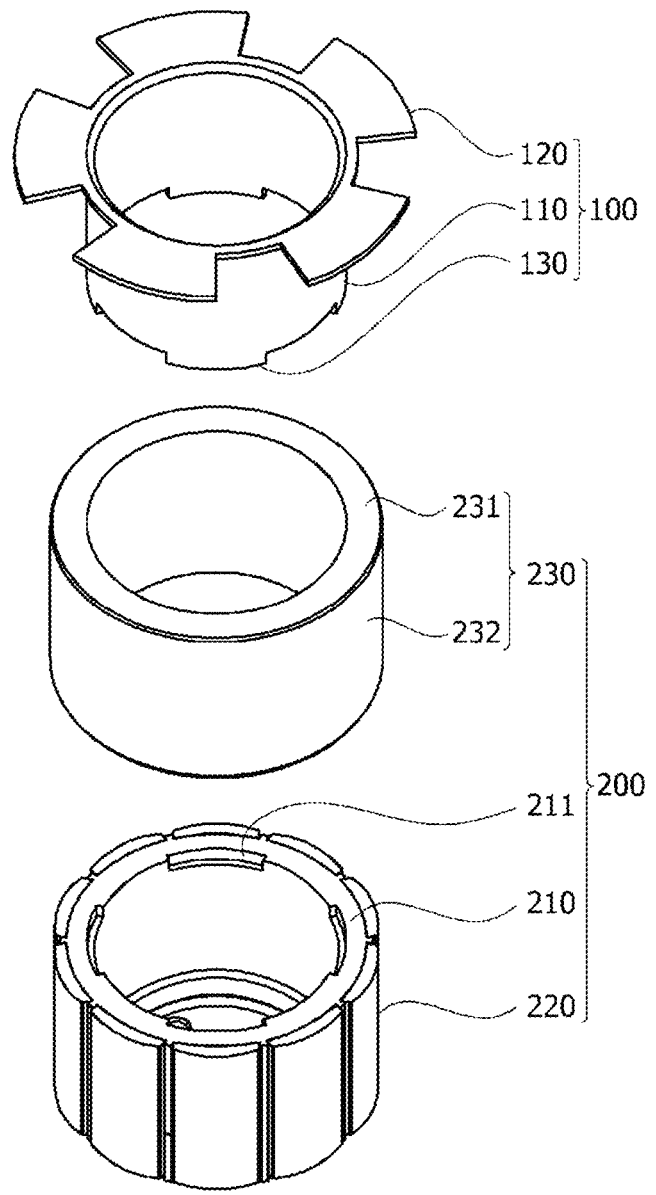
FIG. 3 is an exploded view illustrating the shaft and the rotor illustrated in FIG. 2.

FIG. 2 is a perspective view illustrating the shaft and the rotor illustrated in FIG. 1, and FIG. 3 is an exploded view illustrating the shaft and the rotor illustrated in FIG. 2.

Referring to FIGS. 2 and 3, the shaft 100 includes a first body 110, blades 120, and protrusions 130. The first body 110, the blades 120, and the protrusions 130 may only be distinguished according to shapes and functional characteristics thereof and are vertically connected as one unit.

The first body 110 is a cylindrical member. The blades 120 extend horizontally from an upper end of the first body 110 in a radial direction. The blades 120 detect a position of the rotor 200. The plurality of blades 120 may be disposed at predetermined intervals along a circumference of the first body 110. The blades 120 are disposed above the magnets 220 of the rotor 200. Spaces are provided between the blades 120.

A Hall sensor of an external device may be disposed above the blades 120. The Hall sensor is disposed to face upper ends of the magnets 220 of the rotor 200. When the rotor 200 rotates and the blade 120 is positioned between the Hall sensor and the magnets 220 in an axial direction, the blade 120 blocks the Hall sensor from the magnets 220. In addition, when the rotor 200 rotates and the spaces between the blades 120 are positioned between the Hall sensor and the magnet 220, there is no blocking between the Hall sensor and the magnets 220. Accordingly, when the rotor 200 rotates, a sensing signal of the Hall sensor is generated, and the external device may detect one rotation of the motor on the basis of the generated sensing signal.

During a process of assembling the shaft 100 to the motor, it is important to assemble the shaft 100 and the rotor 200 such that starting points thereof match with each other in a rotational direction. In the motor according to the embodiment, slipping generated between the shaft 100 and the rotor 200 is inhibited by the protrusions 130, and the rotor 200 is also easily aligned with the shaft 100 using the protrusions 130 in the rotational direction during a process of assembling the shaft 100 to the motor.

The protrusions 130 protrude downward from a lower end of the first body 110. The protrusions 130 are inserted into grooves 211 of the rotor core 210. The protrusions 130 are inserted into the grooves 211 so that the shaft 100 and the rotor 200 restrict each other in the rotational direction. The shaft 100 may include the plurality of protrusions 130.

The rotor core 210 incudes the plurality of grooves 211. The grooves 211 are disposed at a boundary between an upper surface and an inner circumferential surface of the rotor core 210. Accordingly, the grooves 211 are concavely formed downward from the upper surface and also concavely formed outward from an inner side surface of the rotor core 210.

Figure 4:
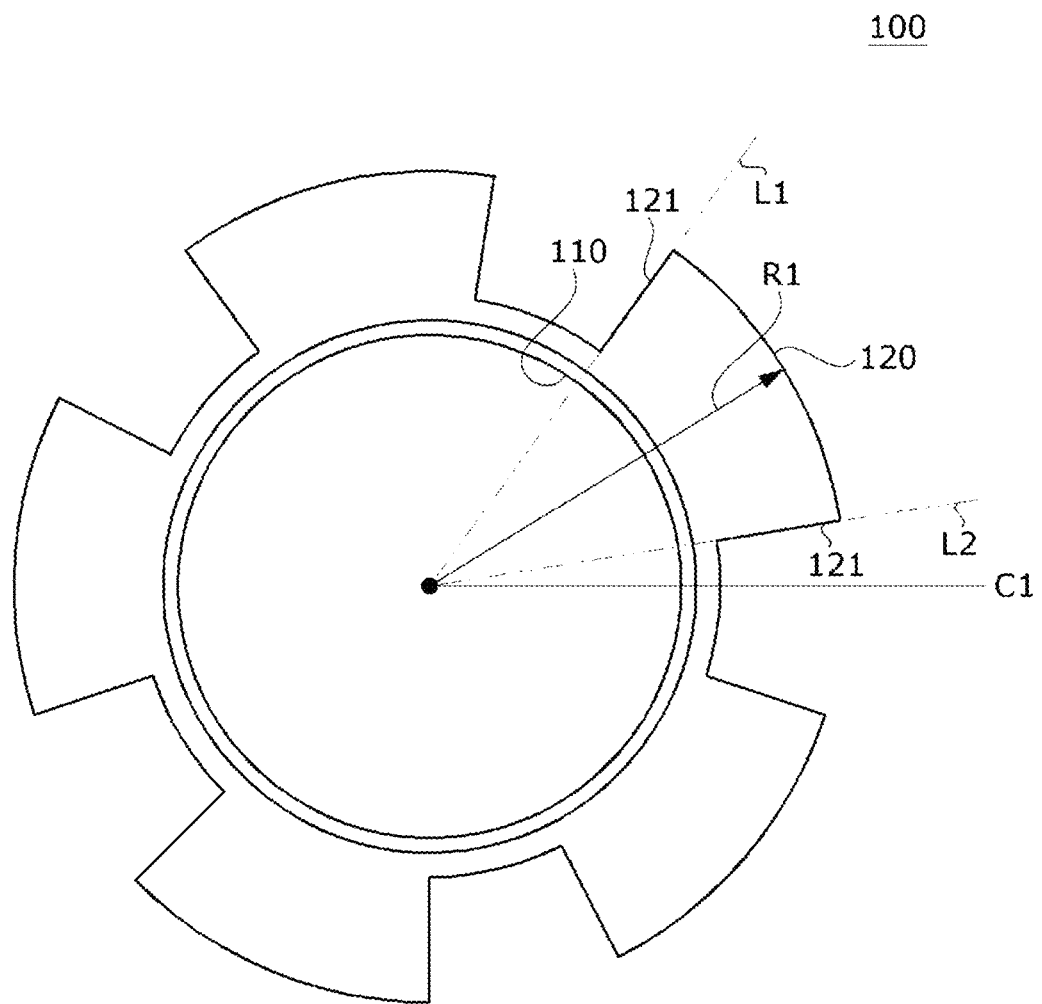
FIG. 4 is a plan view illustrating the shaft.
Figure 5:
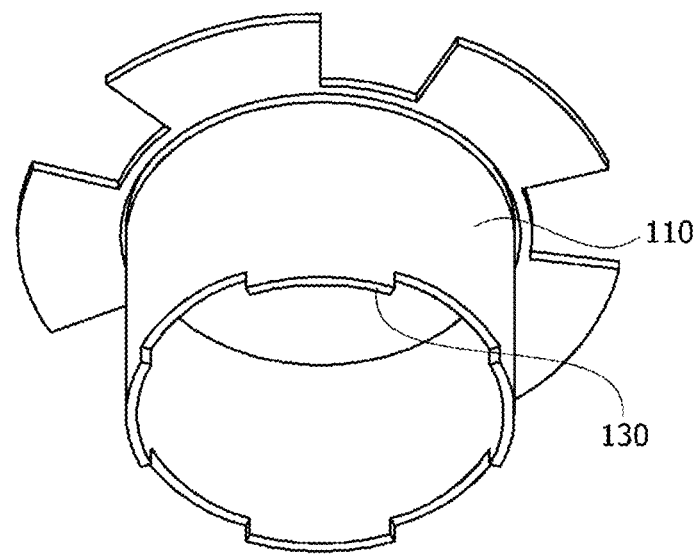
FIG. 5 is a bottom view illustrating the shaft.

FIG. 4 is a plan view illustrating the shaft, and FIG. 5 is a bottom view illustrating the shaft.

Referring to FIG. 4, an outer side surface of the blade 120 is a curved surface. The outer side surface of the blade 120 may be an arc surface having a radius. In addition, side edges 121 of the blade 120 may be designed such that virtual reference lines L1 and L2 extending from the side edges 121 of the blade 120 pass through a center C1 of the shaft 100 in a radial direction of the shaft 100.

Referring to FIG. 5, the protrusions 130 protrude downward from the lower end of the first body 110. The plurality of protrusions 130 may be disposed at predetermined intervals in a circumferential direction of the first body 110. The plurality of protrusions 130 are disposed to be rotationally symmetrical with respect to the center C1 of the shaft 100.

Figure 6:
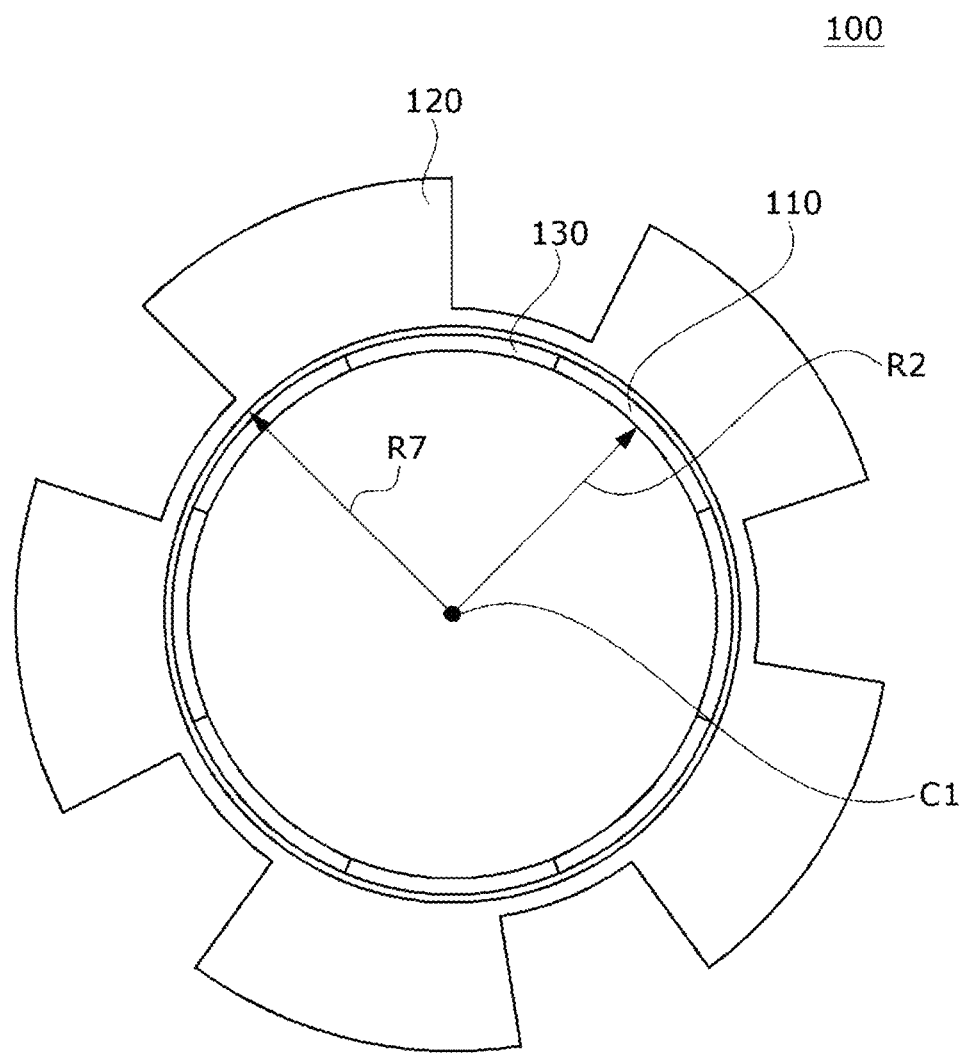
FIG. 6 is a plan view illustrating a state of the shaft coupled to the rotor.
Figure 7:
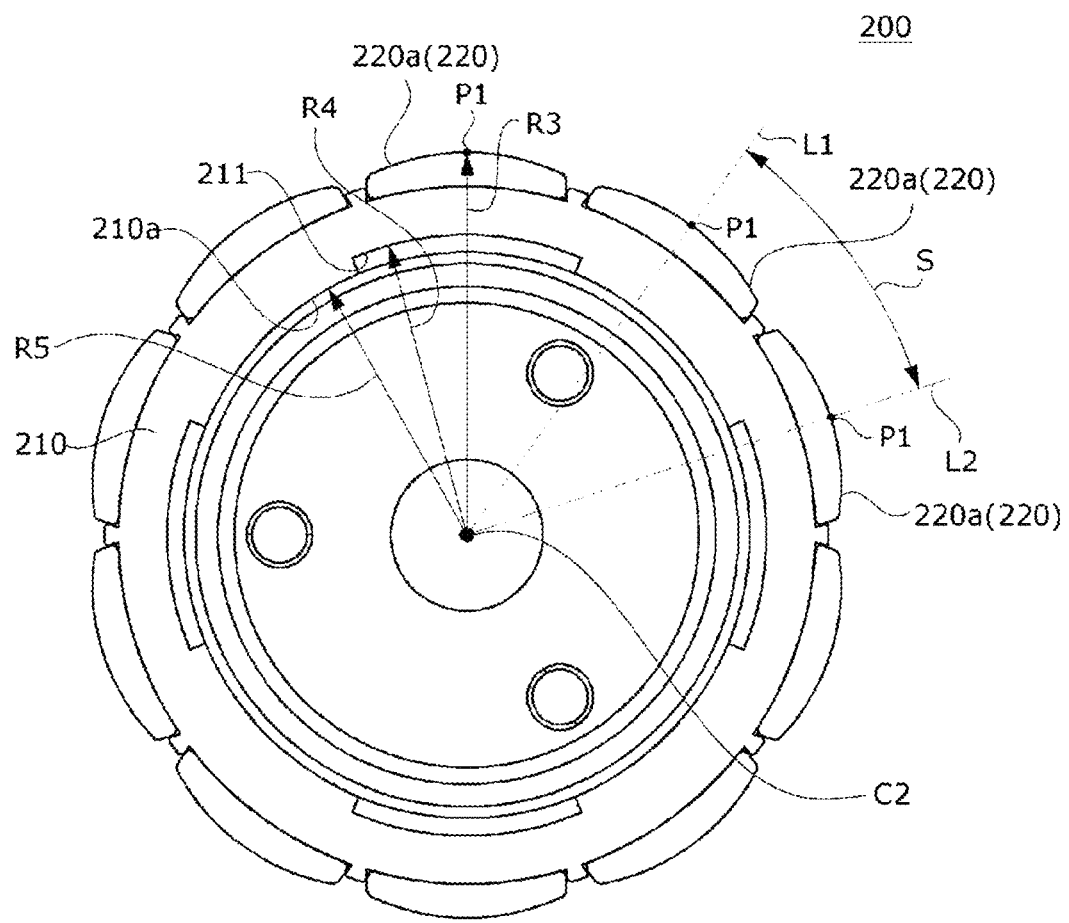
FIG. 7 is a plan view illustrating a rotor core and a magnet.
Figure 8:
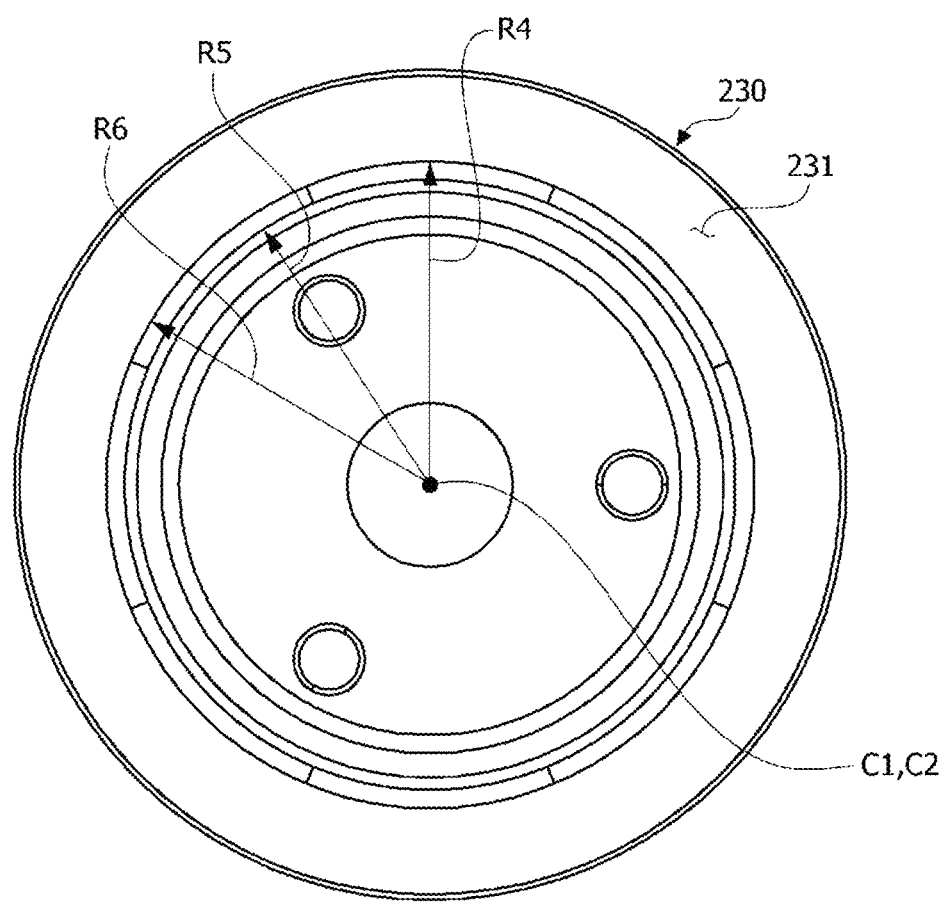
FIG. 8 is a plan view illustrating the rotor.

FIG. 6 is a plan view illustrating a state of the shaft coupled to the rotor, FIG. 7 is a plan view illustrating the rotor core and the magnet, and FIG. 8 is a plan view illustrating the rotor.

Referring to FIGS. 6 and 7, the plurality of blades 120 are disposed to be rotationally symmetrical with respect to the center C1 of the shaft 100. In addition, in the magnets 220, a plurality of unit magnets 220a are disposed along a circumference of the rotor core 210. The plurality of grooves 211 are disposed to be rotationally symmetrical with respect to a center C2 of the rotor core 210. At least one of the plurality of blades 120 may be disposed to overlap two adjacent magnets 220 among the plurality of magnets 220 in the axial direction.

When the protrusion 130 is inserted into the groove 211, the side edge 121 of the blade 120 is positioned at a lateral center P1 of the unit magnet 220a. Accordingly, when the shaft 100 is assembled to the rotor core 210, the blade 120 is disposed in region S of FIG. 7. In this case, a pole of the unit magnet 220a may be an N-pole. When the side edge 121 of the blade 120 is positioned at the lateral center of the unit magnet 220a, the shaft 100 and the rotor 200 are aligned with each other at a rotation starting point at which one rotation of the rotor 200 is detected.

In addition, when the protrusion 130 is inserted into the groove 211, the shaft 100 and the protrusion 130 restrict each other in the rotational direction. Accordingly, slipping between the shaft 100 and the rotor 200 can be inhibited.

A radius R1 (see FIG. 4) from the center C1 of the shaft 100 to the outer side surface of the blade 120 is at least greater than a maximum radius R3 from the center C2 of the rotor core 210 to an outer side surface of the magnet 220.

This is to sufficiently block the magnet 220 from the Hall sensor in the axial direction. In addition, an inner radius R2 of the first body 110 of the shaft 100 may be equal to an inner radius R5 of the rotor core 210. In addition, a distance from the center C1 of the shaft 100 to an inner circumferential surface of the protrusion 130 may correspond to the inner radius R5 of the rotor core 210 in the radial direction of the shaft 100.

Meanwhile, the can 230 includes a second body 232 and an upper surface 231. The second body 232 is a cylindrical member and surrounds the magnets 220. The upper surface 231 is bent horizontally from an upper end of the second body 232 toward a center of the can 230. The upper surface 231 is in contact with an upper surface of the rotor core 210. A hole is formed in a central portion of the upper surface 231. In this case, an inner radius R6 (see FIG. 8) of the upper surface 231 is at least greater than a distance R4 from the center C2 of the rotor core 210 to an outer side surface of the groove 211 in a radial direction of the rotor core 210. This is so that the upper surface 231 does not cover the groove 211. The inner radius R6 of the upper surface 231 corresponds to an outer diameter R7 (see FIG. 6) of the first body 110 of the shaft 100.

Figure 9:
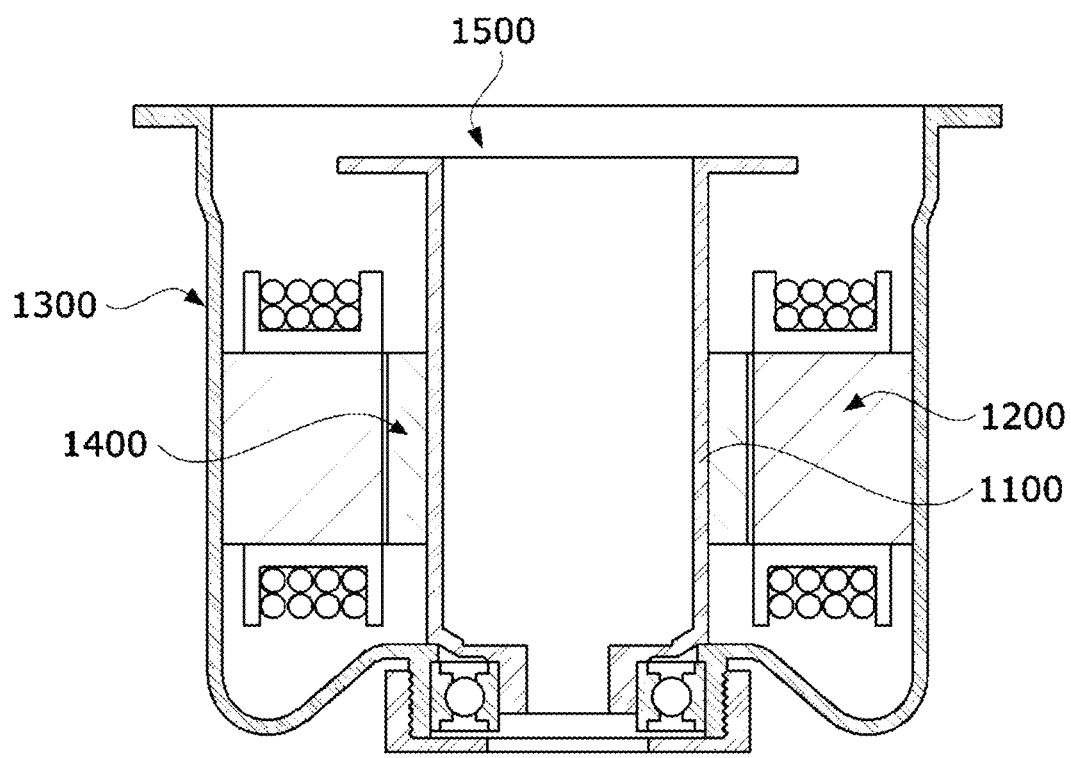
FIG. 9 is a view illustrating a motor according to a second embodiment.

FIG. 9 is a view illustrating a motor according to a second embodiment.

Referring to FIG. 9, the motor according to the embodiment may include a shaft 1100, a stator 1200, a housing 1300, magnets 1400, and a can 1600.

The shaft 1100 may have a hollow shape. The magnets 1400 are directly disposed on a circumference of the shaft 1100. When an electrical interaction is generated between the magnets 1400 and coils of the stator 1200, the shaft 1100 is rotated. The shaft 1100 may be connected to a braking system of a vehicle and transmit power thereto.

The stator 1200 is disposed outside the shaft 1100. The coils may be wound around the stator 1200. The coils induce an electrical interaction with the magnets 1400 of the shaft 1100. The stator 1200 may include a stator core including a plurality of teeth. An annular yoke portion and the teeth around which a coil is wound from a yoke toward a center thereof may be provided in the core of the stator 1200. The teeth may be provided along the outer circumferential surface of the yoke portion at predetermined intervals. Meanwhile, the core of the stator 1200 may be provided as a plurality of thin steel plates which are stacked. In addition, the core of the stator 1200 may be provided as a plurality of divided cores which are coupled or connected.

The shaft 1100 and the stator 1200 are disposed inside the housing 1300.

The magnets 1400 are attached to an outer circumferential surface of the shaft 1100. The plurality of divided magnets 1400 may be attached to the outer circumferential surface of the shaft 1100.

The can 1600 surrounds the magnets 1400. The can 1600 is a member for protecting the magnets 1400. The can 1600 may be formed of an aluminum material. In addition, the can 1600 may be a cylindrical member.

Figure 10:
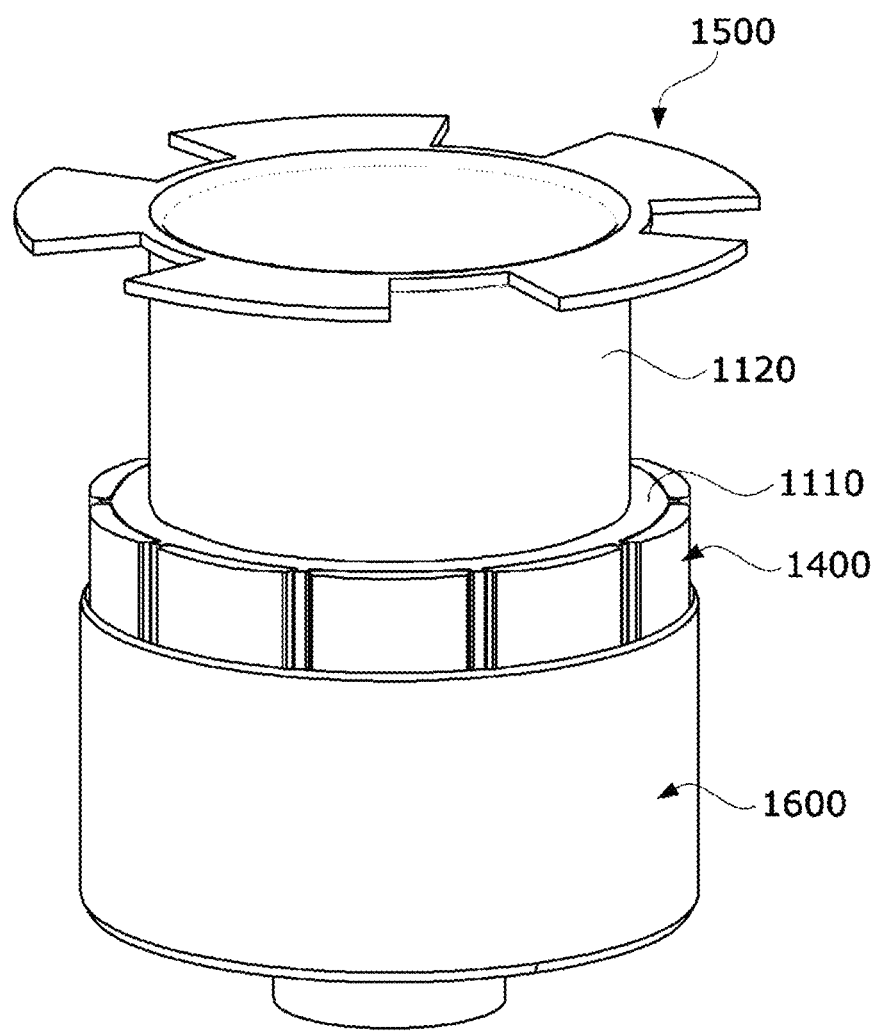
FIG. 10 is a view illustrating a shaft, a blade portion, and a magnet of the motor according to the second embodiment.

FIG. 10 is a view illustrating the shaft 1100, a blade portion 1500, and the magnet 1400 of the motor according to the second embodiment.

Referring to FIG. 10, the motor according to the second embodiment may include the blade portion 1500 as a rotation detector.

The blade portion 1500 may include a body 1510 and a plurality of blades 1520. The body 1510 and the blades 1520 are only distinguished according to shapes and functional characteristics thereof and are vertically connected as one member.

The body 1510 is a member having a ring shape. The blade 1520 may horizontally extend outward from the body 1510. The blade 1520 detects a position of the shaft 1100. The plurality of blades 1520 may be disposed at predetermined intervals along a circumference of the body 1510. Spaces are formed between the blades 1520. The blades 1520 are disposed above the magnets 1400 attached to the shaft 1100.

A Hall sensor of an external device may be disposed above the blades 1520. The Hall sensor is disposed to face upper ends of the magnets 1400. When the shaft 1100 rotates and the blade 1520 is positioned between the Hall sensor and the magnet 1400 in an axial direction, the blade 1520 blocks the Hall sensor from the magnet 1400. In addition, when the shaft 1100 rotates and the spaces between the blades 1520 are positioned between the Hall sensor and the magnet 1400, there is no blocking between the Hall sensor and the magnet 1400. Accordingly, when the shaft 1100 rotates, a sensing signal is generated using a change in magnetic flux detected by the Hall sensor, and the external device may detect one rotation of the motor on the basis of the generated sensing signal.

The shaft 1100 may include a first part 1110 and a second part 1120. The first part 1110 and the second part 1120 may be distinguished in an axial direction of the shaft 1100. An outer diameter of the first part 1110 may be greater than an outer diameter of the second part 1120. Accordingly, the shaft 1100 may have a stepped shape in the axial direction. The magnets 1400 are attached to an outer circumferential surface of the first part 1110. In addition, the blade portion 1500 may be coupled to an upper end of the second part 1120.

Figure 11:
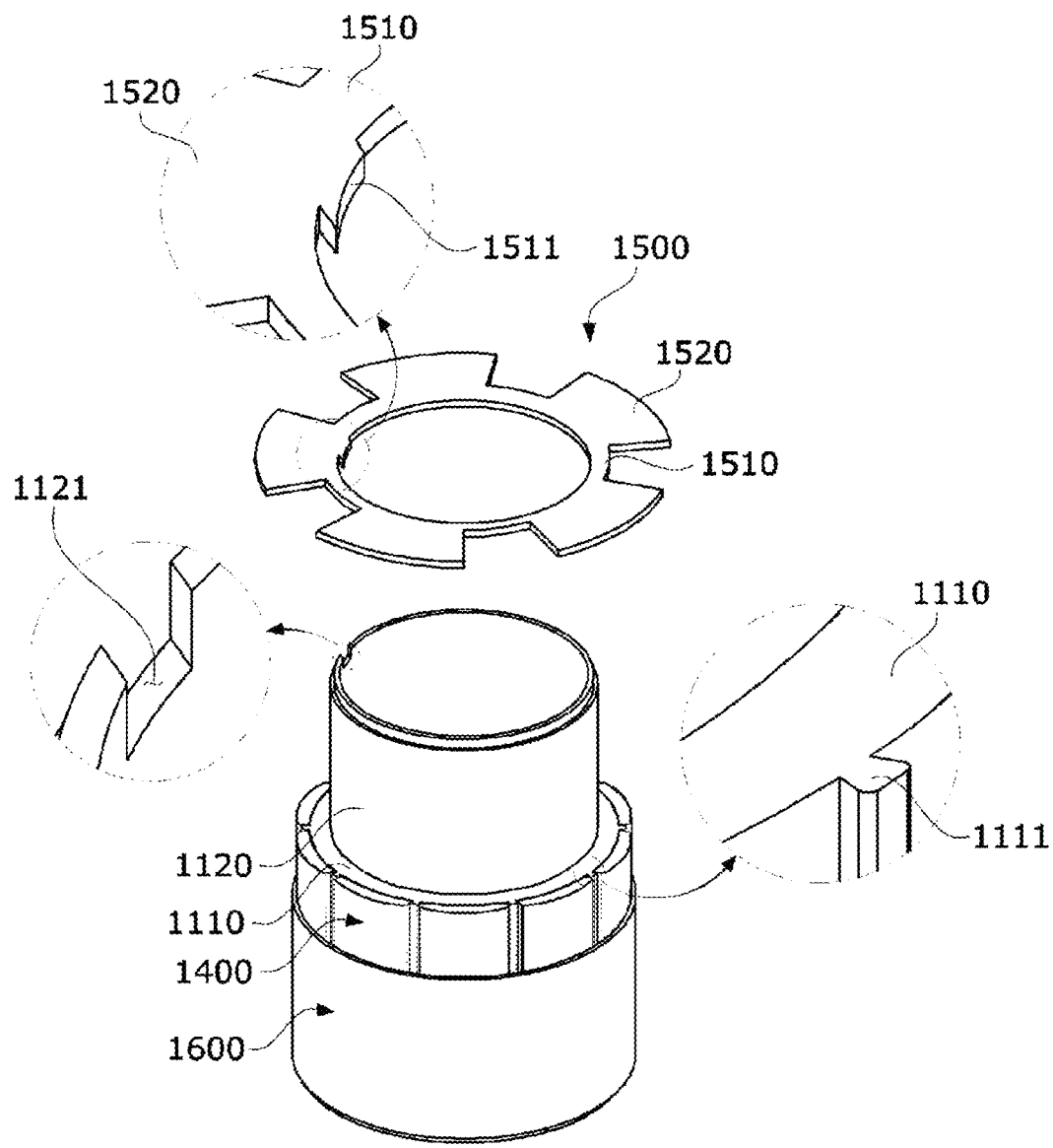
FIG. 11 is a view illustrating a state before the shaft and the blade portion illustrated in FIG. 10 are assembled.

FIG. 11 is a view illustrating a state before the shaft 1100 and the blade portion 1500 illustrated in FIG. 10 are assembled.

Referring to FIG. 11, before the shaft 1100 is coupled to the blade portion 1500, the magnets 1400 may first be attached to an outer circumferential surface of the first part 1110 of the shaft 1100. Accordingly, since a device which attaches the magnets 1400 to the shaft 1100 is not hindered by the blade portion 1500, there is an advantage of easily attaching the magnets 1400 thereto.

During a process of assembling the blade portion 1500 to the shaft 1100, it is important to assemble the shaft 1100 and the blade portion 1500 such that starting points match with each other in a rotational direction. This is because positions, at which the magnets 1400 and the blade portion 1500 are attached to the shaft 1100, should be aligned with each other according to a design reference.

In the motor according to the embodiment, slipping generated between the shaft 1100 and the blade portion 1500 is inhibited by grooves 1121 and protrusions 1511, and the shaft 1100 is also easily aligned with the blade portion 1500 during a process of assembling the blade portion 1500 to the shaft 1100 using the grooves 1121 and the protrusions 1511.

The grooves 1121 may be grooves concavely disposed in the upper end of the second part 1120. In addition, the protrusions 1511 may be protrusions protruding downward from a lower end of the body 1510. The protrusion 1511 may be insertion-fitted into the groove 1121. In addition, a coupling portion of the groove 1121 and the protrusion 1511 may be welded. The protrusion 1511 is inserted into the groove 1121 so that the shaft 1100 and the blade portion 1500 restrict each other in the rotational direction.

The groove 1121 may be provided as the plurality of grooves 1121. The plurality of grooves 1121 may be disposed to be rotationally symmetrical with respect to a rotational center of the shaft 1100. In addition, the protrusion 1511 may be provided as the plurality of protrusions 1511. The plurality of protrusions 1511 may be disposed to be rotationally symmetrical with respect to a rotational center of the blade portion 1500. The number of the grooves 1121 may correspond to the number of the protrusions 1511.

In the drawings, although the grooves 1121 are illustrated as grooves and the protrusions 1511 are illustrated as protrusions, the grooves 1121 may be replaced with protrusions, and the protrusions 1511 may be replaced with grooves or holes.

Guide protrusions 1111 may be disposed on an outer circumferential surface of the first part 1110 of the shaft 1100. The guide protrusions 1111 may be disposed to extend in the axial direction of the shaft 1100. In addition, the plurality of guide protrusions 1111 may be disposed at predetermined intervals in a circumferential direction of the shaft 1100. The magnets 1400 are inserted between the guide protrusions 1111. The first part 1110, the second part 1120, and the guide protrusions 1111 may be integrally formed using a three-dimensional (3D) printer.

Figure 12:
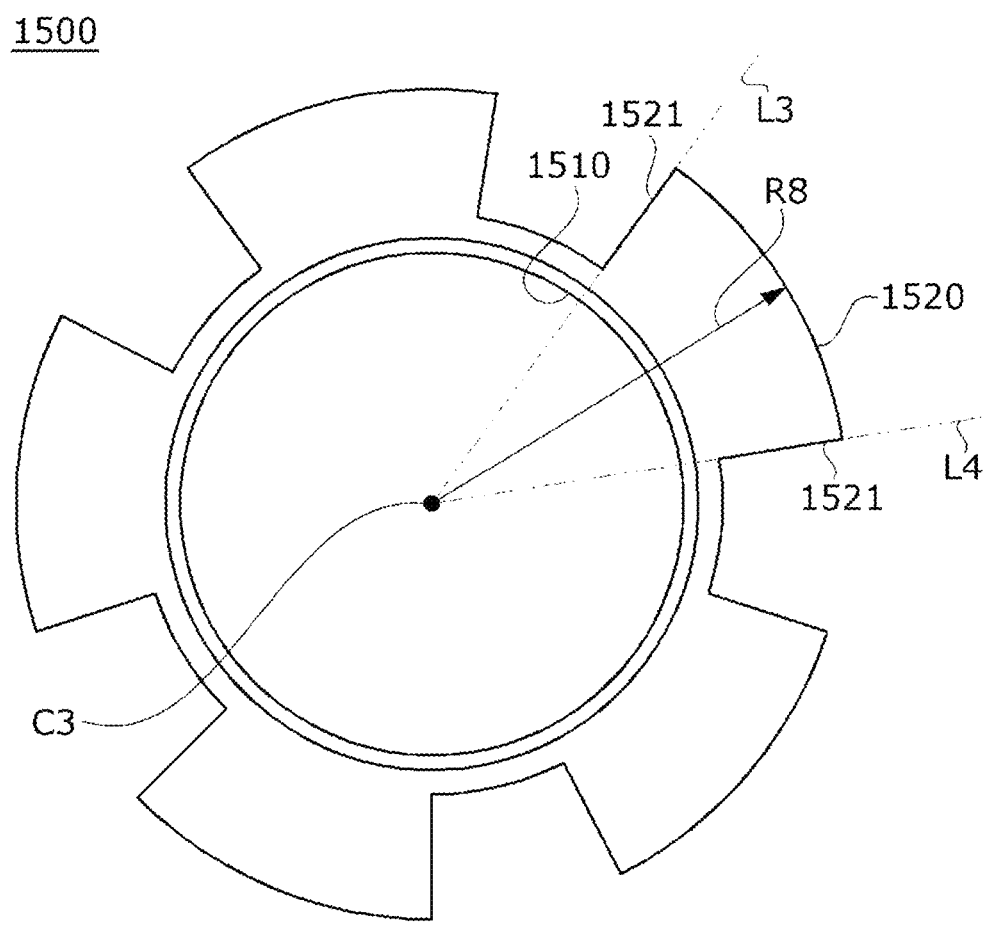
FIG. 12 is a plan view illustrating the blade portion.

FIG. 12 is a plan view illustrating the blade portion 1500.

Referring to FIG. 12, an outer side surface of the blade 1520 is a curved surface. The outer side surface of the blade 1520 is an arc surface having a radius. A curvature center of the outer side surface of the blade 1520 may match a center C1 of the blade portion 1500. In addition, side edges 1521 of the blade 1520 may be designed such that virtual reference lines L3 and L4 extending from the side edges 521 of the blade 1520 pass through a center C3 of the blade portion 1500 in a radial direction of the blade portion 1500. The blade 1520 may be provided as the plurality of blades 1520. The plurality of blades 1520 may be disposed to be rotationally symmetric with respect to the center C1 of the blade portion 1500.

Figure 13:
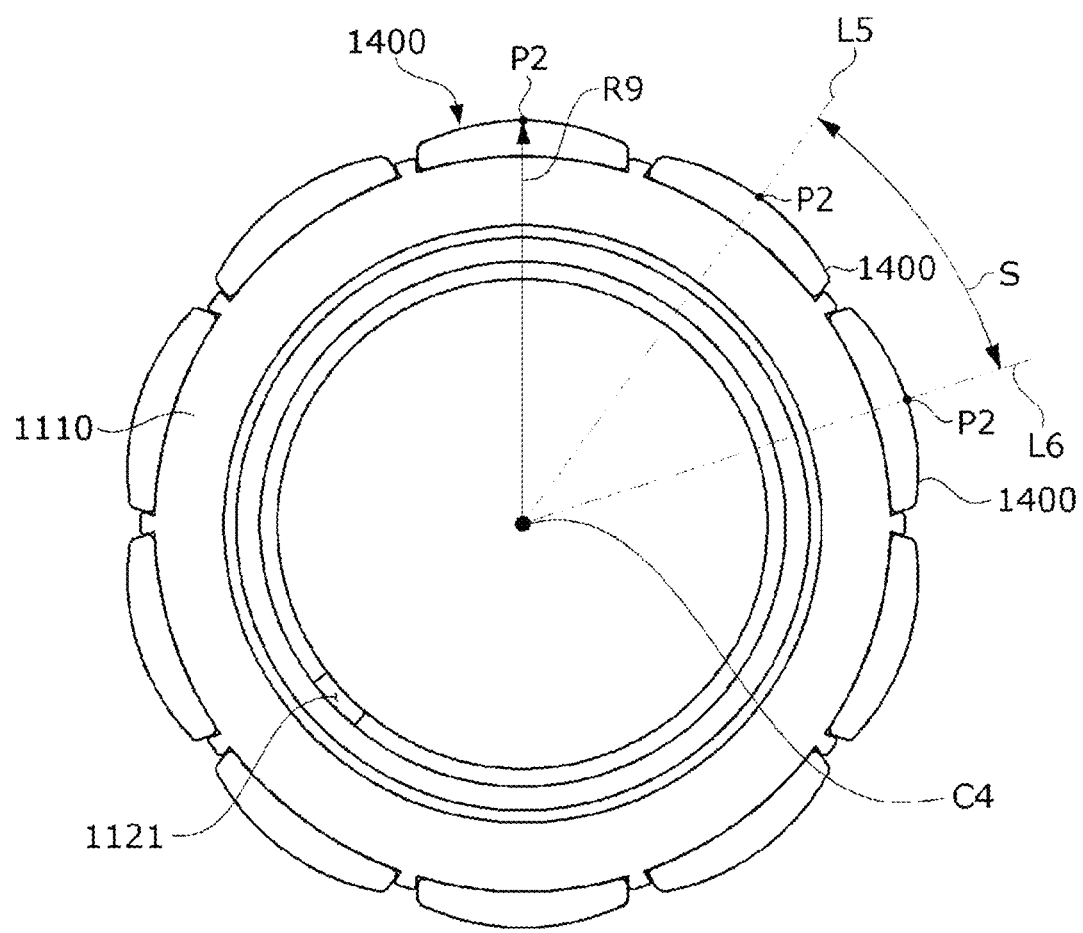
FIG. 13 is a plan view illustrating the shaft.

FIG. 13 is a plan view illustrating the shaft 1100.

Referring to FIG. 13, the plurality of magnets 1400 are disposed along a circumference of the shaft 1100. When the protrusions 1511 are inserted into the grooves 1121, the side edges 521 of the blade 1520 are positioned at lateral centers P2 of the magnets 1400. Accordingly, when the blade portion 1500 is assembled to the shaft 1100, the blade 1520 is disposed in region S of FIG. 13 defined by reference lines L5 and L6 passing through the lateral centers P2 of the magnets 1400 from a center C4 of a rotor core. In this case, a pole of the magnet 1400 may be an N-pole. When the side edges 521 of the blade 1520 are positioned at the lateral centers P2 of the magnets 1400, the blade portion 1500 and the shaft 1100 are aligned with each other at a rotation starting point at which one rotation of the shaft 1100 is detected.

In addition, when the protrusion 1511 is inserted into the groove 1121, the blade portion 1500 and the shaft 1100 restrict each other in the rotational direction. Accordingly, slipping between the blade portion 1500 and the shaft 1100 can be inhibited.

A radius R8 (see FIG. 12) from the center C3 of the blade portion 1500 to the outer side surface of the blade 1520 should be at least greater than a maximum radius R9 from the center C4 of the rotor core to an outer side surface of the magnet 1400. This is to sufficiently block the magnet 1400 from the Hall sensor in a radial direction.

Figure 14:
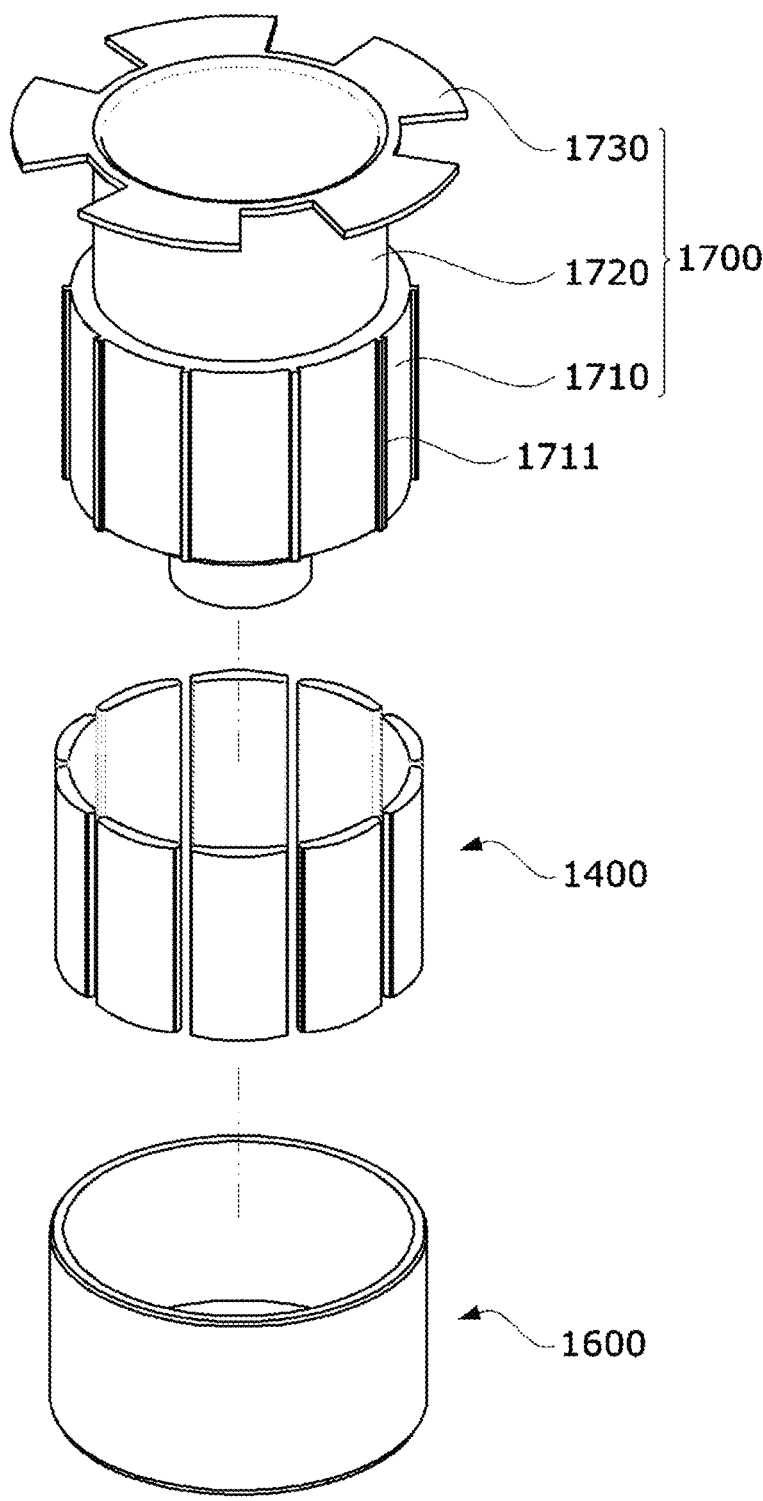
FIG. 14 is a view illustrating a shaft and a magnet of a motor according to a third embodiment.

FIG. 14 is a view illustrating a shaft 1700 and a magnet 1400 of a motor according to a third embodiment.

Referring to FIG. 14, the shaft 1700 of the motor according to the third embodiment may include a first part 1710, a second part 1720, and blades 1730. The blades 730 may be integrally disposed on the second part 1720. A function and a shape of the blade 1730 are the same as those of the blade 1520 of the motor according to the second embodiment. The first part 1710, the second part 1720, and the blades 1730 are integrally formed as one member. In this case, the blades 1730 are formed according to a design reference in consideration of positions of guide protrusions 1711 which are a reference for attaching magnets 1400. Since the blades 1730 are not assembled to the shaft 1700 as individual parts, the blades 1730 may be disposed to extend from an upper end of the shaft 1700 in consideration of positions of the magnets 1400 attached to the second part 1720 when the shaft 1700 is manufactured.

The shaft 1700 including the blades 1730 may be formed using a 3D printer.

In such a motor, since a process of assembling the blade portion 1500 and the shaft 1700 is omitted, advantages are provided in that an alignment error between the shaft 1700 and the blade portion 1500 is fundamentally removed and a manufacturing process is simplified.

As described above, the motor according to one exemplary embodiment of the present invention has been described with reference to the accompanying drawings. The above description is only an example describing a technological spirit of the present invention. Various changes, modifications, and replacements may be made by those skilled in the art within a range without departing from essential characteristics of the present invention. Therefore, the embodiments disclosed above and the accompanying drawings are considered in a descriptive sense only and not to limit the technological scope, and the technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a housing;
a stator disposed inside the housing;
a rotor disposed inside the stator; and
a shaft coupled to the rotor,
wherein the rotor includes a rotor core and a plurality of magnets disposed on an outer circumferential surface of the rotor core,
wherein the rotor core includes grooves concavely disposed at a boundary between an inner circumferential surface and an upper surface of the rotor core,
wherein the shaft includes a first body, a plurality of blades extending from an upper surface of the first body in a radial direction, and a plurality of protrusions protruding downward from a lower surface of the first body,
wherein protrusions of the plurality of protrusions of the shaft are disposed, respectively, in grooves of the plurality of grooves of the rotor core, and
wherein a Hall sensor is disposed above the plurality of blades, the Hall sensor facing upper axial ends of the magnets of the plurality of magnets of the rotor.

2. The motor of claim 1, wherein at least one blade of the plurality of blades overlaps two adjacent magnets of the plurality of magnets.

3. The motor of claim 2, wherein the at least one blade is disposed between centers of the two adjacent magnets.

4. The motor of claim 1, wherein:
blades of the plurality of blades are disposed to be spaced apart from each other by a predetermined interval in a circumferential direction of the first body; and
extension lines extending along side surfaces of the blades of the plurality of blades pass through a center of the shaft.

5. The motor of claim 4, wherein the extension lines extending along the side surfaces of the blades of the plurality of blades pass through longitudinal centers of magnets of the plurality of magnets in a circumferential direction thereof.

6. The motor of claim 1, wherein at least one of the plurality of blades, the plurality of protrusions, and the plurality of grooves is disposed to be rotationally symmetrical with respect to a center of the shaft.

7. The motor of claim 1, wherein a radius from a center of the shaft to an outer side surface of each blade of the plurality of blades is greater than a maximum radius from a center of the rotor core to each magnet, respectively, of the plurality of magnets.

8. The motor of claim 1, wherein:
the rotor includes a can disposed outside the plurality of magnets;
the can includes a second body and an upper surface bent to extend from an upper surface of the second body; and
an inner radius of the upper surface corresponds to an outer diameter of the first body of the shaft.

9. A motor comprising:
a housing;
a stator disposed inside the housing;
a shaft disposed inside the stator; and
a plurality of magnets disposed on an outer circumferential surface of the shaft,
wherein the shaft includes a first part, a second part that extends from the first part and has an outer diameter different from an outer diameter of the first part, and a blade portion extending from the second part in a radial direction,
wherein the first part includes an outer circumferential surface on which a plurality of guide protrusions are formed at predetermined intervals in a circumferential direction,
wherein magnets of the plurality of magnets are disposed, respectively, between guide protrusions of the plurality of guide protrusions of the first part, and
wherein a plurality of blades of the blade portion are disposed at predetermined intervals in the circumferential direction.

10. The motor of claim 9, wherein:
a body of the second part and the blade portion are formed to be divided from each other;
the body includes a groove;
the blade portion includes a ring portion having a circular shape and a plurality of protrusions bent from an inner circumferential surface of the ring portion;
the plurality of blades are formed to protrude from an outer circumferential surface of the ring portion; and
the protrusion of the blade portion is disposed in the groove of the body.

11. The motor of claim 1, wherein:
when the rotor rotates, a sensing signal of the Hall sensor is generated, and the Hall sensor detects one rotation of the motor on a basis of the generated sensing signal, because when one blade of the plurality of blades is positioned between the Hall sensor and the plurality of magnets in an axial direction, the blade blocks the Hall sensor from the plurality of magnets, and when a space between blades of the plurality of blades is positioned between the Hall sensor and the plurality of magnets, the Hall sensor detects the plurality of magnets.

12. The motor of claim 1, wherein the plurality of protrusions are aligned with the plurality of blades in the axial direction.

\* \* \* \* \*